United States Patent [19]

Haase et al.

[11] Patent Number: 5,739,632
[45] Date of Patent: Apr. 14, 1998

[54] LUMINESCENT PHOSPHOR SCREEN CONTAINING CATENA-POLYPHOSPHATE

[75] Inventors: Markus Haase, Aachen; Helmut Bechtel, Roetgen; Wolfram Czarnojan, Aachen; Walter Mayr, Würselen; Joseph Lauter, Aachen, all of Germany

[73] Assignee: U.S. Philips Corporation, New York, N.Y.

[21] Appl. No.: 565,768

[22] Filed: Dec. 1, 1995

[30] Foreign Application Priority Data

Dec. 1, 1994 [DE] Germany ............... 44 42 706.9
Dec. 2, 1994 [DE] Germany ............... 44 42 905.3

[51] Int. Cl.$^6$ ............... H01J 29/10; C09K 11/08
[52] U.S. Cl. ............... 313/467; 252/301.6 P; 252/301.4 P; 252/301.16; 252/301.4 R; 313/461
[58] Field of Search ............... 313/461, 462, 313/468, 503, 505, 509, 467; 252/301.6 P, 301.4 P, 301.16, 301.4 R; 428/402, 403

[56] References Cited

U.S. PATENT DOCUMENTS 3,602,753  8/1971  Evans ............... 313/467
4,340,839  7/1982  Fujita et al. ............... 313/467
4,377,769  3/1983  Beatty et al. ............... 313/495
4,539,506  9/1985  Ohtani et al. ............... 313/467

OTHER PUBLICATIONS

"Photochemistry of semiconductor particles. I. Optical properties of ZnS sols", by Ling Zang et al., J. Photochem. Photoboil A 1994, pp. 189–195.

"Absorption and Fluorescence Behavior of Redispersible CdS Colloids in Various Organic Solvents", by U. Resch et al, Langmuir 1992, pp. 2215–2218.

Primary Examiner—Sandra L. O'Shea
Assistant Examiner—Joseph Williams
Attorney, Agent, or Firm—John C. Fox

[57] ABSTRACT

The invention relates to a display screen comprising a phosphor composition of a sulphide and/or selenide-containing phosphor which is provided with a coating which comprises one or more catena-polyphosphates of one or more alkaline earth metals, zinc, cadmium and/or manganese. In such a display screen, in particular a low-energy cathode ray display screen, the advantages of the efficient sulphide or selenide-containing phosphors can be used and said display screen remains bright and rich in contrast for a long period of time because the coating acts as a stabilizing protective coating which limits the corrosion processes in sulphide and/or selenide-containing phosphors induced by low-energy radiation.

9 Claims, No Drawings

LUMINESCENT PHOSPHOR SCREEN CONTAINING CATENA-POLYPHOSPHATE

BACKGROUND OF THE INVENTION

The invention relates to a display screen, especially a flat-panel display screen such as a low-energy cathode ray display screen, which comprises a phosphor composition of a sulphide or selenide-containing phosphor which is provided with a coating.

The trend towards flat-panel display screens has led to low-energy cathode ray display screens which constitute a new development in the field of luminescent-display devices. Flat-panel display screens were developed for three market segments, i.e. office automation, audio/video technology and navigation and entertainment. In the field of office automation reference must be made, in particular, to mobile applications which range from the Notebook Computer, Personal Digital Assistant, fax machine to the mobile telephone. In the field of audio/video, the flat-panel display screens are intended not only for use in camcorders but also in television receivers and monitors. The third field of application comprises flat-panel display screens which are to be used as monitors for navigation systems in cars and aircraft, but also as display screens for electronic games.

In the case of flat-panel display screens, geometric and other aspects have led to a reduction of the maximum accelerating voltage to values which are much lower than in customary cathode ray display screens. As, on the other hand, the picture brightness and energy efficiency of the display screen decreases as the accelerating voltage decreases, said accelerating voltage must not be reduced too much. Low-energy cathode ray display screens are therefore operated at accelerating voltages in the range from approximately 2 to 10 kV. Said accelerating voltages are clearly below those of customary cathode ray display screens, which are operated at a voltage of typically 25–35 kV; however, they are clearly above the accelerating voltage of vacuum fluorescent display screens, which are operated at approximately 0.01 to 0.3 kV.

Phosphors for cathode ray display screens, also when they are of the conventional type, are customarily subjected to a surface treatment so that they can more adequately meet the requirements.

One of the requirements to be met is that the phosphor compositions should be readily dispersable in dispersion solutions used in the photolithographic manufacturing processes for display screens. For this purpose, surface coatings are developed which yield free-flowing powders from which stable dispersions can be made in a simple manner.

A further aspect in the development of coatings is the protection against the agressive chemicals used in the photolithographic manufacturing processes. Particularly in the customarily used "flow coating"-process in which dichromates are applied, unprotected phosphors are subject to chemical attack.

Further requirements to be met by phosphors relate to the colour quality. This is the reason why in the so-called "pigmented" phosphors the coating of dispersing aids is replaced by or combined with a second type of coating whose main constituents are colour particles. Said colour particles reduce the reflection of ambient light from the phosphor grains and hence increase the contrast of the image depicted on the display screen.

In the case of phosphors whose chromatic values of the emitted light deviate from the standard, said colour particles may additionally serve as colour filters which bring the chromatic values of the phosphor powder in conformity with said standard.

Functionally different coatings are used in the case of phosphors for vacuum fluorescent display screens in which excitation takes place by means of low-energy electrons of several tens of volts to maximally several hundred volts. In this case, charging effects during excitation of the phosphors, which adversely affect the excitation efficiency, must be precluded. Coatings for phosphor powders for vacuum fluorescent display screens are therefore composed of conductivity-improving materials such as indium tin oxide, fine metal powders and such.

Phosphors used for low-energy cathode ray display screens must meet entirely new requirements. In order to achieve a good picture brightness inspite of the low exciting voltage, these display screens must be operated at high currents. To ensure that the necessary current does not increase to impracticably high values, use must simultaneously be made of phosphors having a high efficiency. Even if the architecture of the display screen permits extremely high current values, the low efficiency of a phosphor cannot be compensated for at will by increasing the current value because, after increasing linearly with the current intensity, the luminous intensity of the phosphor finally attains a saturation value. The current intensity at which this saturation value is attained depends upon the type of phosphor used and on how it must be prepared.

Therefore, it is very important for low-energy cathode ray display screens that the phosphors used exhibit a high efficiency and that they reach said saturation value only at high current intensities. The condition of a high efficiency at a sufficiently high saturation value is fulfilled by only very few phosphors, in particular by sulphide-containing phosphors and selenide-containing phosphors such as ZnS:Ag, ZnS:Cu, ZnCdSe:Ag and such.

However, under the excitation conditions in low-energy cathode ray display screens, said sulphide and/or selenide-containing phosphors are very rapidly degraded, i.e. the bombardment with low-energy electrons leads to an accelerated reduction of the luminous intensity and efficiency of the phosphor. Probably the low penetration depth of the low-energy electrons causes the radiation-induced reactions to be concentrated and intensified in the surface layers of the phosphor grains.

In conventionally coated display screens, which are excited by a low-energy cathode ray tube, a rapid reduction in brightness is observed. In coloured display screens, in which customarily three different phosphors are used, this additionally leads to a slow change of the chromatic values of all mixed colours when each one of the phosphors used does not degrade at an equal rate.

However, commercial low-energy cathode ray display screens, for example colour television receivers having a flat display screen should produce images having a constant brightness and pure chromatic values for many thousand hours of operation.

OBJECTS AND SUMMARY OF THE INVENTION

It is an object of the invention to provide a display screen comprising a phosphor composition of a sulphide and/or selenide-containing phosphor with a coating, which composition does not degrade when it is excited by electrons of approximately 1 to 10 kV.

This object is achieved in accordance with the invention by a display screen comprising a phosphor composition of a sulphide and/or selenide-containing phosphor which is provided with a coating which comprises one or more catena-polyphosphates of one or more alkaline earth metals, zinc, cadmium and/or manganese.

In such display screens, the advantages of the efficient sulphide and/or selenide-containing phosphors can be used and said display screens remain bright and rich in contrast for a long period of time.

It has surprisingly been found that a coating which is essentially composed of catena-polyphosphates of the above-mentioned type acts as a stabilizing protective coating which limits the corrosion processes in sulphide and/or selenide-containing phosphors induced by low-energy radiation.

The moisture-free catena-polyphosphates of the above-mentioned type form a hard, water-insoluble coating on the phosphor particles, they do not react with these sulphidic or selenide-containing substrates and they are not even degraded by radiation. Since they are colourless, they do not influence the chromatic values of the phosphors. They are hydrophillic, so that the coated particles can be easily dispersed.

The above-mentioned catena-polyphosphates preferably have a chain length of 3 to 90.

Within the scope of the invention it may be preferred that the coating comprises catena-polyphosphates of one or more alkaline earth metals and 0.1 to 20 wt. % catena-polyphosphates of zinc, cadmium and/or manganese.

A preferred embodiment of the invention is characterized in that the alkaline earth metal is calcium or strontium or barium and the coating comprises 10 wt. % cadmium-catena-polyphosphate.

It is further preferred that the alkaline earth metal is at least an element selected from the group formed by calcium, strontium and/or barium, and the coating comprises 5 wt. % zinc-catena-polyphosphate and/or 5 wt. % manganese-catena-polyphosphate.

A small quantity of cadmium, zinc or manganese in the coating solution has a positive effect on the deposition of the coating.

It may further be preferred that the phosphor is composed of activated zinc sulphide, zinc-cadmium sulphide, zinc sulphide selenide and/or zinc-cadmium-sulphide selenide and that the coating comprises one or more calcium-catena-polyphosphates. This phosphor composition is distinguished by a very good adhesion of the coating to the phosphor substrate.

A preferred embodiment of the invention is characterized in that the phosphor is composed of activated zinc sulphide, zinc selenide and/or zinc sulphide selenide and the coating is predominantly composed of cadmium polyphosphate. Cadmium polyphosphate can very readily be separated from an aqueous solution. The phosphor does not have to be activated beforehand.

A further preferred embodiment of the invention is characterized in that the phosphor is composed of activated zinc sulphide, zinc selenide and/or zinc sulphide selenide and the coating is predominantly composed of zinc polyphosphate. Said coating bonds very well to zinc-containing phosphors.

It may alternatively be preferred that the phosphor is composed of activated cadmium sulphide and/or cadmium sulphide selenide and that the coating is predominantly composed of cadmium polyphosphate. This coating bonds very well to cadmium-containing phosphors.

The phosphor composition may also have a covering layer of a dispersing aid. The inventive coating per se is abrasion-resistant, so that the coated phosphor as such can be transported and used. Customarily, however, phosphor powders are provided with a covering layer of a dispersing aid for ease of handling. It has been found that dispersing aids, in particular those which comprise surface-bonded hydroxyl groups, such as $SiO_2$, further promote ageing of the phosphors, thus, it is particularly advantageous to protect a sulphide or selenide-containing phosphor, having a covering layer of a dispersing aid such as $SiO_2$, by a stabilizing intermediate layer of one or more alkaline earth metal-catena-polyphosphates of the above-mentioned type.

For the same reason, combining a sulphide and/or selenide-containing phosphor having a stabilizing coating of one or more of the above-mentioned alkaline earth metal-catena-polyphosphates with a covering layer, which comprises pigments, particularly those having surface-bonded hydroxyl groups, is particularly advantageous.

To manufacture the coating for a sulphide and/or selenide-containing phosphor, which coating is essentially composed of one or more alkaline earth metal-catena-polyphosphates, in a first step, the phosphor is stirred in powder form into a water-containing solution of one or more water-soluble polyphosphates, whereafter the pH-value of the suspension thus obtained is set to 5–8 and, while holding said pH-value constant, one or more alkaline earth metal-catena-polyphosphates are precipitated on the phosphor powder by adding an aqueous solution of a water-soluble calcium salt and/or strontium salt and/or barium salt. It may be preferred that the aqueous solution additionally contains the water-soluble salts of zinc, cadmium and/or manganese.

To manufacture a coating for a sulphide and/or selenide-containing phosphor, which coating is predominantly composed of zinc-catena-polyphosphate and/or cadmium-catena-polyphosphate and/or manganese-catena-polyphosphate, in a first step, the phosphor is stirred in powder form into an aqueous solution of a water-soluble alkali polyphosphate or ammonium polyphosphate having a pH<5.5, whereafter the pH-value of the suspension thus obtained is set to >5.5 and, subsequently, zinc-catena-polyphosphate, cadmium-catena-polyphosphate and/or manganese-catena-polyphosphate is precipitated on said phosphor powder by adding a water-soluble zinc salt and/or cadmium salt and/or manganese salt.

Said pretreatment with one or more water-soluble polyphosphates is advantageous in two respects: first, polyphosphate has a dispersing effect on the phosphor powders which, as is known, tend to agglomerate; further, the pretreatment activates the phosphor surface, so that more alkaline earth metal-catena-polyphosphate, zinc-catena-polyphosphate, cadmium-catena-polyphosphate or manganese-catena-polyphosphate can be deposited on the surface than without this pretreatment.

The bond between the inventive coating and the sulphide and/or selenide-containing phosphor is so strong that it is resistant even in an acqueous solution. A few other heavy-metal polyphosphates also adhere well to sulphide and/or selenide-containing phosphors, however, it has surprisingly been found that the inventive alkaline earth metal-catena-polyphosphates, zinc-catena-polyphosphates, cadmium-catena-polyphosphates and/or manganese-catena-polyphosphates also preclude degradation of sulphidic and/or selenidic phosphors by low-energy cathode radiation.

The aqueous solution of the water-soluble tetraalkyl ammonium polyphosphate may comprise a water-miscible organic solvent. It has surprisingly been found that by using aqueous-organic solvent mixtures an improved surface coating for the phosphor substrate is obtained. Tetraalkyl ammonium polyphosphates, such as tetramethyl ammonium polyphosphate or tetrabutyl ammonium polyphosphate, can very readily be dissolved in said aqueous-organic solvents.

Within the scope of the invention it may further be preferred that the water-containing solution of the water-soluble alkali polyphosphates comprises a water-miscible organic solvent and a tetraalkyl ammonium salt. Said tetraalkyl ammonium salt, for example tetraalkyl ammonium nitrate, acts as a phase-transfer reagent. It increases the solubility of the alkali phosphates in aqueous organic solvent mixtures and promotes the activation of the substrate surface.

These and other aspects of the invention will be apparent from and elucidated with reference to the embodiments described hereinafter.

DESCRIPTION OF THE PREFERRED EMBODIMENTS

The sulphide and/or selenide-containing phosphors, which are provided with a stabilizing coating in accordance with the invention, are in the first place phosphors on the basis of ZnS, such as ZnS:Ag, ZnS:Cu, ZnS:Mn and such. In accordance with the invention, it is further possible to stabilize phosphors on the basis of cadmium sulphide, zinc selenide and cadmium sulphide selenide as well as activated mixed-crystal phoshors such as zinc cadmium sulphide and zinc sulphide selenide.

These phosphor substrates can take the form of primary particles or of granulates mixed with latex and pigments. The grain size of the phosphor particles is not critical. The primary grain size of commercially available phosphors ranges approximately from 2 to 20μ.

These substrate particles are covered with a thin and uniform layer of one or more alkaline earth metal-catena-polyphosphates. The layer thickness customarily ranges from 0.001 to 0.2 μm and, as it is so thin, penetration of electrons takes place without an appreciable loss of energy.

The coating may additionally comprise organic or inorganic binders, such as latex, methyl cellulose or aluminium phosphates and $SiO_2$, to further improve the density of the coating and to limit the possibility of chemical attacks on the substrate.

For the starting compounds of the coating use is made of soluble alkali polyphosphates, ammonium polyphosphates or alkyl ammonium polyphosphates as well as water-soluble calcium salts, strontium salts and/or barium salts, and for the further catena-polyphosphates use is also made of the water-soluble salts of the bivalent cations of cadmium, manganese and zinc. Sodium polyphosphate and ammonium polyphosphate can be bought on a large scale because they are also used as fertilizers. The other soluble alkali polyphosphates and alkyl ammonium polyphosphates can be manufactured from these commercially available polyphosphates by ion exchange or by reacting polyphosphoric acids with the corresponding hydroxides or amines.

Polyphosphates of the type used herein are unbranched, chain-like phosphates comprising the double-bonded $PO_4$ tetrahydron as the base unit of the chain. Their systematic name is "catena-polyphosphates". Sodium polyphosphates are prepared on a large scale in a condensation reaction from the acid primary salts of orthophosphoric acid. In this condensation reaction, dehydration takes place; the water-vapour pressure over the melt, the heating temperature, the heating duration along with the cooling rate determine the chain length and the crystallinity of the polyphosphate obtained. All the time, mixtures having different chain lengths are obtained. Dependent upon the reaction conditions, products are obtained whose trivial names are "Graham's salt", "Madrell's salt" $(NaPO_3)_x$ or "Kurrol's salt" $(KPO_3)_x$. Unlike the substantially insoluble "Madrells salt" and the little soluble "Kurrol's salt", "Graham's salt" can be readily dissolved in water and is preferred within the scope of the invention. The chain length is highly dependent upon the accuracy of the conditions of preparation, it may vary from manufacturer to manufacturer, sometimes even from batch to batch.

In addition, it is rather time-consuming to analyticially determine the chain lengths. Consequently, according to data on the average chain length of the preferred Graham's salt, said chain length ranges, dependent upon the origin, between "12–18" and "up to 400". Polyphosphates having sufficiently long chains differ little in chemical properties and hence are all equally suitable for the invention. An upper limit of the chain length is set by the water solubility. The water solubility decreases as the chain length increases and also depends on the type of cation.

Other water-soluble polyphosphates, which are manufactured in the same way as "Graham's salt" and which are referred to as "phosphate glass" or "water-soluble hexamethaphosphate" can also be used.

Long-chain water-soluble polyphosphates having an average chain length of 80–90 can still be used for the invention.

In short-chain polyphosphates the properties of the polyphosphates change in the direction of orthophosphates because the influence of the terminal phosphate groups on the chemical properties increases. Short-chain polyphosphates having a chain length <3 are unsuitable for the invention.

For the water-soluble calcium salts, strontium salts, barium salts, cadmium salts, manganese salts or zinc salts use can be made, in particular, of their nitrates, acetates or perchlorates.

For the water-soluble zinc and cadmium salts, use can suitably be made of their halogenides, in particular chlorides, and of their sulphates, nitrates or acetates. These zinc and cadmium compounds are individually or jointly dissolved in water. The concentration of the zinc or cadmium salts in the solution may range from 0.01 to 1 mol/l.

For the manufacture of the coating solution one or more water-soluble catena-polyphosphates are individually or jointly dissolved in water. The concentration of the polyphosphate in the aqueous solution may be, dependent upon the chain length and the cation, 0.5 to 10 wt. %.

Water is customarily used as the solvent. A quantity of 20 to 90 wt. % of an organic solvent, such as ethanol, methanol, acetone etc requires special safety measures, however, it leads to a better deposition of the polyphosphates. Catena-polyphosphates comprising organic quaternary ammonium ions, such as tetramethyl ammonium polyphosphate and tetrabutyl ammonium polyphosphate still can be very easily dissolved in such aqoues organic solvent mixtures. It is alternatively possible to increase the solubility of sodium polyphosphates in such solvent mixtures by adding quaternary ammonium salts such as tetramethyl ammonium nitrate.

The phosphor to be coated is dispersed in this solution for 10 to 30 min.

Further, a solution of a water-soluble calcium salt, strontium salt, barium salt, cadmium salt, manganese salt and/or zinc salt in water is prepared in a concentration ranging from 1 to 15 wt. %.

This solution is added to the phosphor suspension, while continuously monitoring the pH-value. The pH-value must remain in the neutral to alkaline range, preferably between 9.5 and 11, for which purpose a sodium hydroxide solution or ammonia is added if necessary.

This suspension is stirred for 1–5 hours to irreversibly age the colloidal coating.

Subsequently, the coated phosphor is separated from the excess of coating solution, whereafter it is washed with a washing liquid, for example alcohol/water, and dried at 100°–150° C.

By virtue of this method, a mechanically and chemically very resistant coating is obtained which adheres well to the substrate.

The coating thus produced has a thickness of approximately 10 nm. By means of ESCA measurements it can be determined that the coating completely covers the phosphor substrates, although it is not essential to the invention that the coating tightly encloses the substrate particles.

The coating is hydrophilic and compatible with the customary coatings, so that it can suitably be used as the base layer for further coatings which may be subsequently provided to improve the powder properties or chromatic values of the material.

The coating itself does not show any signs of degradation. ALT tests show that, all in all, the life of the material is increased by a factor of 5–10 due to the coating. It is particularly advantageous if the coating additionally comprises $SiO_2$. This $SiO_2$ coating may be applied in the form of a mixture with the alkaline earth metal-catena-polyphosphate coating, or it can be separately provided as a covering layer on this coating. Applying an $SiO_2$ coating leads to a further increase of the flowability of the powder.

Dependent upon the method used to manufacture display screens, the coated phosphor compositions are used in the "dry" state, i.e. as dry powders or in the "wet" state, i.e. suspended in a photoresist. In a "wet method", the phosphor powder does not have to be isolated as a dry powder after the coating operation, but is immediately processed further in solution. Instead of separating the phosphor from the excess of coating solution, washing the phosphor with a washing liquid and, subsequently, drying it, a photoresist is added to the phosphor suspended in the coating solution, and the phosphor/resist suspension is applied as a film to a substrate, dried, exposed through a shadow mask and the unexposed parts are removed by washing.

EXEMPLARY EMBODIMENT 1
(catena-calcium-polyphosphate)

A quantity of 41 g Graham's salt (Merck) are stirred into 5000 ml water and dissolved by stirring for one hour, whereafter they are filtered through a $G_3$ glass filter (Shott). A quantity of 2000 g ZnS:Ag phosphor are suspended in said solution and stirred for 20 minutes. Simultaneously, 56.7 g $Ca(NO_3)_2.4H_2O$ are dissolved in 4800 ml water and 200 ml 1-molar ammonia solution are added to said solution. This ammoniacal calcium-salt solution is added to the phosphor suspension. After stirring for two hours, the coated phosphor is allowed to sediment and the supernatant solution is centrifuged off. The phosphor composition is washed several times with a 1:1 mixture of water and acetone, and then with pure acetone, whereafter it is dried at 100° C.

The phosphor thus coated is separated from the solution by centrifuging, whereafter it is washed twice with a diluted sodium hydroxide solution having a pH of 11.0, and then with acetone, whereafter it is dried at 140° C.

EXEMPLARY EMBODIMENT 2
(catena-strontium-polyphosphate)

A quantity of 200 ml 1-molar ammonia solution which is cooled to 5° C. are admixed with 16.8 g polyphosphoric acid (96 wt. %, Merck). As soon as the pH-value falls below 6, concentrated ammonia solution is added dropwise, so that the pH-value of the solution is approximately 7 after the polyphosphoric acid has dissolved completely. Subsequently, the solution is brought to 2500 ml by adding water.

A quantity of 1000 g ZnS:Ag phosphor are suspended in said solution and stirred for 20 minutes. Simultaneously, 0.150 mol $Sr(NO_3)_2$ are dissolved in 2400 ml water and the pH-value of the solution is set to 11.9 by adding 13-molar ammonia solution. The alkaline strontium-salt solution is added dropwise to the phosphor suspension, the pH-value of the suspension being held between 6.9 and 7.5 by adding an ammonium-hydroxide solution. After stirring for one hour, the phosphor thus coated is allowed to sediment and the supernatant solution is removed. Subsequently, the phosphor powder is washed several times with a 1:1 mixture of water and acetone, then with acetone and subsequently the phosphor composition is dried at 100° C.

EXEMPLARY EMBODIMENT 3
(catena-barium-polyphosphate)

A quantity of 8.4 g polyphosphoric acid (96 wt. %, Merck) are admixed with 100 ml 1-molar tetramethyl ammonium-hydroxide solution which is cooled to 5° C. As soon as the pH-value drops below 6, a 25% tetramethyl ammonium hydroxide solution is added dropwise, so that the solution has a pH-value of approximately 7 after the polyphosphoric acid has dissolved completely. Subsequently, the solution is brought to 410 ml by adding water.

A quantity of 500 g ZnS:Ag phosphor are suspended in said solution and stirred for 20 minutes, whereafter the pH-value of the suspension is set to 7.3 by adding a tetramethyl ammonium hydroxide solution. Simultaneously, 0.075 mol $Ba(NO_3)_2$ are dissolved in 300 ml water and the pH-value of the solution is set to 12.2 by adding a 25% tetramethyl ammonium hydroxide solution (25 wt. % in water).

The alkaline barium-salt solution is added dropwise to the phosphor suspension, the pH-value of the suspension being held between 6.8 and 7.5 by adding a tetramethyl ammonium hydroxide solution. After stirring for a short period of time, the coated phosphor is allowed to sediment and the supernatant solution is removed. The phosphor powder is washed several times with a 1:1 mixture of water and acetone, then with acetone, and subsequently it is dried at 100° C.

EXEMPLARY EMBODIMENT 4
(calcium tripolyphosphate)

A quantity of 0.04 mol $Na_5P_3O_{10}$ are dissolved in 4000 ml water. A quantity of 1000 g ZnS:Ag phosphor are stirred into this solution and ultrasonically dispersed. A quantity of 2000 ml water is added to 1000 ml of an aqueous 0.1 molar $Ca(NO_3)_2$ solution. Subsequently, a 1-molar sodium hydroxide solution is added until a pH-value of 11.2 is attained. This calcium-nitrate solution is added dropwise to the phosphor suspension within one hour.

The coated phosphor powder is centrifuged off, washed several times with a 1:1 mixture of water and acetone, and dried at 120° C.

EXEMPLARY EMBODIMENT 5
(catena-calcium-strontium-polyphosphate)

A quantity of 16.8 g polyphosphoric acid (96 wt. %, Merck) are admixed with 200 ml 1-molar lithium hydroxide solution which is cooled to 5° C. As soon as the pH-value falls below 6, a lithium-hydroxide solution is added dropwise, so that the pH-value of the solution is approximately 7 after the polyphosphoric acid has dissolved completely. Subsequently, the solution is brought to 2500 ml by adding water.

A quantity of 1000 g ZnS:Ag phosphor are suspended in said solution and stirred for 20 minutes. Simultaneously, 0.075 mol $Sr(NO_3)_2$ and 0.075 mol $Ca(NO_3)_2.4H_2O$ are dissolved in 2400 ml water and the pH-value of the solution is set to 11.9 by adding a lithium-hydroxide solution. The alkaline strontium-salt/calcium-salt solution is added dropwise to the phosphor suspension, the pH-value of the suspension being held between 6.9 and 7.5 by adding a lithium-hydroxide solution. After stirring for 1 hour, the coated phosphor is allowed to sediment and the supernatant solution is removed. Said phosphor powder is washed several times with a 1:1 mixture of water and acetone, then with acetone, and subsequently it is dried at 100° C.

EXEMPLARY EMBODIMENT 6
(catena-calcium-barium-polyphosphate)

A quantity of 8.4 g polyphosphoric acid (96 wt. %, Merck) are admixed with 100 ml 1-molar tetrabutyl ammonium hydroxide solution which is cooled to 5° C. As soon as the pH-value falls below 6, a 1-molar tetrabutyl ammonium hydroxide solution is added dropwise so that the pH-value of the solution is approximately 7 after the polyphosphoric acid has dissolved completely. Subsequently, the solution is brought to 410 ml by adding water. A quantity of 500 g ZnCdS:Ag phosphor is suspended in said solution and stirred for 20 minutes, whereafter the pH-value of the suspension is set to 7.3 by adding a tetrabutyl-ammonium-hydroxide solution. Simultaneously, 0.50 mol $Ca(NO_3)_2.4H_2O$ and 0.025 mol $Ba(NO_3)_2$ are dissolved in 300 ml water and the pH-value of the solution is set to 12.2 by adding a tetrabutyl-ammonium-hydroxide solution (40 wt. % in water).

The alkaline calcium-salt/barium-salt solution is added dropwise to the phosphor suspension, the pH-value of the suspension being held between 7.0 and 7.3 by adding a tetrabutyl-ammonium-hydroxide solution. After stirring for a short period of time the coated phosphor is allowed to sediment and the supernatant solution is removed. The phosphor powder is washed several times with a 1:1 mixture of water and acetone, then with acetone and subsequently it is dried at 100° C.

EXEMPLARY EMBODIMENT 7
(catena-calcium-polyphosphate with cadmium polyphosphate)

A quantity of 8.4 g polyphosphoric acid (96 wt. %, Merck) are admixed with 100 ml 1-molar ammonium-hydroxide solution which is cooled to 5° C. As soon as the pH-value falls below 6, a 1-molar ammonium-hydroxide solution is added, so that the pH-value of the solution is approximately 7 after the polyphosphoric acid has dissolved completely. Subsequently, the solution is brought to 410 ml by adding water. A quantity of 500 g ZnCdS:Ag phosphor are suspended in said solution and stirred for 20 minutes, whereafter the pH-value of the suspension is set to 7.3 by adding an ammonium-hydroxide solution. Simultaneously, 0.065 mol $Ca(NO_3)_2.4H_2O$ and 0.010 mol $Cd(NO_3)_2$ are dissolved in 300 ml water and the pH-value of the solution is set to 12.2 by adding a 25% ammonium-hydroxide solution. The alkaline calcium-salt/cadmium-salt solution is added dropwise to the phosphor suspension, the pH-value of the suspension being held between 7.0 and 7.3 by adding an ammonium-hydroxide solution. After stirring for a short period of time, the coated phosphor is allowed to sediment and the supernatant solution is removed. The phosphor powder is washed several times with a 1:1 mixture of water and acetone, and subsequently with acetone, whereafter it is dried at 100° C.

EXEMPLARY EMBODIMENT 8
(catena-strontium-barium-polyphosphate)

A quantity of 16.8 g polyphosphoric acid (96 wt. %, Merck) are admixed with 200 ml 1-molar potassium-hydroxide solution which is cooled to 5° C. As soon as the pH-value falls below 6, a potassium-hydroxide solution is added dropwise, so that the pH-value of the solution is approximately 7 after the polyphosphoric acid has dissolved completely. Subsequently, the solution is brought to 2500 ml by adding water. A quantity of 1000 g ZnS:Cu phosphor are dissolved in said solution and stirred for 20 minutes. Simultaneously, 0.075 mol $Sr(NO_3)_2$ and 0.075 mol $Ba(NO_3)_2$ are dissolved in 2400 ml water and the pH-value of the solution is set to 11.9 by adding a 13-molar ammonia solution. The alkaline strontium-salt/barium-salt solution is added dropwise to the phosphor suspension, the pH-value of the suspension being held between 7.0 and 7.3 by adding a potassium-hydroxide solution. After stirring for one hour, the coated phosphor is allowed to sediment and the supernatant solution is removed. The phosphor powder is washed several times with a 1:1 mixture of water and acetone, and then with acetone, whereafter it is dried at 100° C.

EXEMPLARY EMBODIMENT 9
(catena-calcium-strontium-barium-polyphosphate)

A quantity of 40 g "phosphate glass" (Sigma) are stirred into 5000 ml of deionized water, dissolved by stirring for one hour, and subsequently filtered through a $G_3$ glass filter (Shott). A quantity of 2000 g ZnS:Cu phosphor are suspended in said solution and stirred for 20 minutes. Simultaneously, 18.9 g $Ca(NO_3)_2.4H_2O$, 16.9 g $Sr(NO_3)_2$ and 20.9 g $Ba(NO_3)_2$ are dissolved in 4800 ml water, and 200 ml 1-molar sodium hydroxide solution is added to said solution. The alkaline calcium-strontium-barium-salt solution is added to the phosphor suspension. After stirring for two hours, the coated phosphor is allowed to sediment and the supernatant solution is removed. The phosphor composition is washed several times with a 1:1 mixture of water and acetone, and then with acetone, whereafter it is dried at 100° C.

EXEMPLARY EMBODIMENT 10

A quantity of 8.4 g polyphosphoric acid (96 wt. %, Merck) are admixed with 100 ml 1-molar tetramethyl-ammonium-hydroxide solution which is cooled to 5° C. As soon as the pH-value falls below 6, a 25% tetramethyl-ammonium-hydroxide solution is added dropwise, so that the pH-value of the solution is approximately 7 after the polyphosphoric acid has dissolved completely. Subsequently, 300 ml ethanol is added to the solution. A quantity of 500 g $ZnS_{0.9}Se_{0.1}$:Ag phosphor are suspended in said solution and stirred for 20 minutes, whereafter the pH-value of the suspension is set to 7.3 by adding a tetramethyl-ammonium-hydroxide solution. Simultaneously, 0.075 mol $Ca(NO_3)_2$ are dissolved in 75 ml water to which 225 ml ethanol is added, and the pH-value of the solution is set to 11.2 by adding a 25% tetramethyl-ammonium-hydroxide solution (25 wt. % in water). The alkaline calcium-salt solution is added dropwise to the phosphor suspension, the pH-value of the suspension being held between 6.8 and 7.5 by adding a tetramethyl-ammonium-hydroxide solution. After stirring for a short period of time, the coated phosphor is allowed to sediment and the supernatant solution is removed. The phosphor powder is washed several times with a 1:3 mixture of water and ethanol, and then with ethanol, whereafter it is dried at 100° C.

EXEMPLARY EMBODIMENT 11

A quantity of 500 g phosphor in accordance with exemplary embodiments 1 to 10 are dispersed in a mixture of 3300 ml ethanol, 525 ml water and 625 ml 4-molar ammonia solution. A quantity of 50 ml of a 0.34-molar solution of tetraethoxy silane in ethanol are added to said phosphor suspension, while stirring vigorously, and stirred at a temperature of 20° to 50° C. for 12 hours. Subsequently, the suspension is filtered, the phosphor is washed with a 1:1 mixture of water and acetone, and finally dried.

EXEMPLARY EMBODIMENT 12

A quantity of 1000 g phosphor in accordance with exemplary embodiments 1 to 10 are stirred into 7.5 litres of a 1:1 mixture of water and acetone, and 20 ml of a colloidal silicic acid solution (Ludox® AS-40, Dupont, 40% in water relative to $SiO_2$) are added to the suspension. The pH-value of the suspension should be approximately 6 and, if necessary, is readjusted by means of $H_2SO_4$. Next, the suspension is stirred for 12 hours. Subsequently, the suspension is filtered, the phosphor is washed with a 1:1 mixture of water and acetone, and finally dried.

EXEMPLARY EMBODIMENT 13

(phosphor with a pigment coating)

A quantity of 16.8 g polyphosphoric acid (96 wt. %, Merck) are admixed with 200 ml 1-molar ammonia solution which is cooled to 5° C. As soon as the pH-value falls below 6, a concentrated ammonia solution is added dropwise, so that the pH-value of the solution is approximately 7 after the polyphosphoric acid has dissolved completely. Subsequently, the solution is brought to 2500 ml by adding water. A quantity of 1000 g of a blue-luminescing ZnS:Ag phosphor are suspended in said solution and stirred for 20 minutes. Simultaneously, 0.150 mol $Ca(NO_3)_2$ are dissolved in 2400 ml water and the pH-value of the solution is set to 11.9 by adding a 13-molar ammonia solution. The alkaline calcium-salt solution is added dropwise to the phosphor suspension, the pH-value of the suspension being held between 6.9 and 7.5 by adding an ammonium-hydroxide solution. A quantity of 200 g $CoAl_2O_4$ pigment are suspended in 500 ml water and the pigment suspension is introduced into an agitating ball mill along with grinding balls of yttrium-stabilized $ZrO_2$. After grinding for 2 hours at 750 U/min, 25 ml of the pigment suspension are added to the phosphor suspension. Immediately after that, a solution of 4.0 g of a latex (Neocryl A550® ICI, 40% in water) in 56 ml water are added to the suspension and stirred for one hour. Subsequently, the coating reaction is initiated by adding 50 ml of a 1-molar $NH_4NO_3$ solution. Subsequently, the suspension is filtered; the phosphor is washed with a 1:1 mixture of water and ethanol, and, finally, dried for 24 hours at 50° C.

EXEMPLARY EMBODIMENT 14

A quantity of 16.8 g polyphosphoric acid (96 wt. %, Merck) are admixed with 200 ml of a 1-molar ammonia solution which is cooled to 5° C. As soon as the pH-value falls below 6, a concentrated ammonia solution is added dropwise, so that the pH-value of the solution is approximately 7 after the polyphosphoric acid has dissolved completely. Subsequently, the solution is brought to 2500 ml by adding water. A quantity of 1000 g red-luminescing ZnCdS:Ag phosphor are suspended in said solution and stirred for 20 minutes. Simultaneously, 0.150 mol $Sr(NO_3)_2$ are dissolved in 2400 ml water, and the pH-value of the solution is set to 11.9 by adding a 13-molar ammonia solution. The alkaline strontium-salt solution is added dropwise to the phosphor suspension, the pH-value of the suspension being held between 6.9 and 7.5 by adding an ammonium-hydroxide solution.

A quantity of 200 g of red $Fe_2O_3$ pigment are suspended in 500 ml water and the pigment suspension is introduced into an agitating ball mill together with grinding balls of yttrium-stabilized $ZrO_2$. After grinding for 2 hours at 750 U/min, 25 ml of the pigment suspension are added to the phosphor suspension. Immediately after that, a solution of 4.0 g of a latex (Neocryl A550®, ICI, 40% in water) in 56 ml water are added to the suspension and stirred for one hour. Subsequently, the coating reaction is initiated by adding 50 ml of a 1-molar $NH_4NO_3$ solution. Subsequently, the suspension is filtered, the phosphor is washed with a 1:1 mixture of water and ethanol and, finally, dried for 24 hours at 50° C.

EXEMPLARY EMBODIMENT 15

(cadmium polyphosphate)

A quantity of 300 g Graham's salt (Merck) are stirred into 5000 ml water and dissolved by stirring for one hour, whereafter they are passed through a $G_3$ glass filter (Shott). A quantity of 1000 g ZnS:Ag phosphor are suspended in said solution, the pH-value of the suspension is set to 2.6 by adding 1-molar sulphuric acid, whereafter the suspension is stirred for 15 minutes. The pH-value of the suspension is increased to 11.4 by adding 1-molar sodium hydroxide solution. Immediately after that, 2500 ml of a 0.1 molar $CdSO_4$ solution are added in portions; simultaneously, while cadmium sulphate is being added, the pH-value is held between 9.5 and 11.4 by adding an appropriate quantity of a 1-molar sodium hydroxide solution. At the end of the reaction, the pH-value of the suspension should be 11.0. The phosphor thus coated is separated from the solution by centrifuging, whereafter it is washed twice with a diluted sodium hydroxide solution having a pH of 11.0, and then with acetone, whereafter it is dried at 140° C.

EXEMPLARY EMBODIMENT 16

(cadmium polyphosphate)

A quantity of 8.4 g polyphosphoric acid (96 wt. %, Merck) are admixed with 100 ml 1-molar tetramethyl ammonium hydroxide solution which is cooled to 5° C. As soon as the pH-value drops below 6, a 25% tetramethyl ammonium solution is added dropwise, so that the solution has a pH-value of approximately 7 after the polyphosphoric acid has dissolved completely. Subsequently, 310 ml water is added to said solution. A quantity of 500 g red-luminescing ZnCdS:Ag phosphor are suspended in said solution and stirred for 20 minutes, whereafter the pH-value of the suspension is set to 7.3 by adding tetramethyl ammonium hydroxide solution. Simultaneously, 0.075 mol $Cd(NO_3)_2$ are dissolved in 300 ml water. The cadmium-salt solution is added dropwise to the phosphor suspension, and the pH-value of the suspension is held between 6.8 and 7.5 by adding a tetramethyl ammonium hydroxide solution.

After stirring for a short period of time, the coated phosphor is allowed to sediment and the supernatant solution is removed. The phosphor composition is washed several times with a 1:1 mixture of water and ethanol, then with ethanol, and subsequently it is dried at 100° C.

EXEMPLARY EMBODIMENT 17
(cadmium polyphosphate)

A quantity of 8.4 g polyphosphoric acid (96 wt. %, Merck) are admixed with 100 ml 1-molar tetramethyl ammonium hydroxide solution which is cooled to 5° C. As soon as the pH-value drops below 6, a 25% tetramethyl ammonium solution is added dropwise, so that the solution has a pH-value of approximately 7 after the polyphosphoric acid has dissolved completely. Subsequently, 300 ml ethanol are added to the solution. A quantity of 500 g $ZnS_{0.9}Se_{0.1}$:Ag phosphor are suspended in said solution and stirred for 20 minutes, whereafter the pH-value of the suspension is set to 7.3 by adding a tetramethyl ammonium hydroxide solution. Simultaneously, 0.075 mol $Cd(ClO_4)_2$ are dissolved in 75 ml water and 225 ml ethanol are added to the solution. The cadmium-salt solution is added dropwise to the phosphor suspension, the pH-value of the suspension being held between 6.8 and 7.5 by adding a tetramethyl ammonium hydroxide solution. After stirring for a short period of time, the coated phosphor is allowed to sediment and the supernatant solution is removed. The phosphor composition is washed several times with a 1:3 mixture of water and ethanol, then with ethanol, and subsequently it is dried at 100° C.

EXEMPLARY EMBODIMENT 18
(zinc polyphosphate)

A quantity of 600 g phosphate glass (Sigma) are dissolved in 5000 ml water. A quantity of 500 g ZnS:Cu phosphor are stirred into said solution and dispersed ultrasonically. The pH-value of the solution is set to 3 by adding 1-molar nitric acid, whereafter the solution is stirred for 15 minutes. Subsequently, 1-molar sodium hydroxide solution is added until a pH-value of 5.8 is attained. Immediately after that, 5000 ml of a 0.1 molar $Zn(NO_3)_2$ solution are added in portions; simultaneously, while zinc nitrate is being added, the pH-value is held between 5.8 and 6.1 by adding an appropriate quantity of 1-molar sodium hydroxide solution. At the end of the reaction, the pH-value of the suspension should be 6.1. A quantity of 1000 ml acetone is added to the suspension which is stirred for 5 minutes into the water-acetone mixture thus obtained. Subsequently, the coated phosphor powder is filtered-off and dried at 120° C.

EXEMPLARY EMBODIMENT 19
(zinc polyphosphate)

A quantity of 8.4 g polyphosphoric acid (96 wt. %, Merck) are admixed with 100 ml 1-molar tetramethyl ammonium hydroxide solution which is cooled to 5° C. As soon as the pH-value falls below 6, a 25% tetramethyl ammonium solution is added dropwise, so that the pH-value of the solution is approximately 7 after the polyphosphoric acid has dissolved completely. Subsequently, 30 ml water are added to the solution. A quantity of 500 g ZnS:Cu phosphor are suspended in said solution and stirred for 20 minutes, whereafter the pH-value of the suspension is set to 7.3 by adding an ammonium hydroxide solution. Simultaneously, 0.075 mol $Zn(NO_3)_2$ are dissolved in 300 ml water.

The zinc-salt solution is added dropwise to the phosphor suspension, the pH-value of the suspension being held between 6.8 and 7.5 by adding an ammonium hydroxide solution. After stirring for a short period of time, the coated phosphor is allowed to sediment and the supernatant solution is removed. The phosphor composition is washed several times with a 1:1 mixture of water and ethanol, then with ethanol, whereafter it is dried at 100° C.

EXEMPLARY EMBODIMENT 20

A quantity of 500 g phosphor in accordance with exemplary embodiments 15 to 17 are dispersed in a mixture of 3300 ml ethanol, 525 ml water and 625 ml 4-molar ammonia solution. A quantity of 50 ml of a 0.34 molar solution of tetraethoxy silane in ethanol are vigorously stirred into said phosphor suspension which is then stirred at a temperature of 20° to 50° C. for 12 hours. Subsequently, the suspension is filtered, whereafter the phosphor is washed with a 1:1 mixture of water and ethanol, and finally dried.

EXEMPLARY EMBODIMENT 21

A quantity of 1000 g phosphor in accordance with exemplary embodiments 15 to 19 are stirred into 7.5 litres of a 1:1 mixture of water and acetone, and 20 ml of a colloidal silicic acid solution (Ludox® AS-40, Dupont 40% in water relative to $SiO_2$) are added to the suspension. The pH-value of the suspension should be approximately 6 and, if necessary, is readjusted by means of $H_2SO_4$. Next, the suspension is stirred for 12 hours. Subsequently, the suspension is filtered, whereafter the phosphor is washed with a 1:1 mixture of water and acetone, and finally dried.

EXEMPLARY EMBODIMENT 22

A quantity of 16.8 g polyphosphoric acid (96 wt. %, Merck) are admixed with 200 ml 1-molar ammonia solution which is cooled to 5° C. As soon as the pH-value falls below 6, a concentrated ammonia solution is added dropwise, so that the pH-value of the solution is approximately 7 after the polyphosphoric acid has dissolved completely. Subsequently, the solution is brought to 2500 ml by adding water.

A quantity of 1000 g of a blue-luminescing ZnS:Ag phosphor are suspended in said solution and stirred for 20 minutes. Simultaneously, 0.150 mol $Cd(NO_3)_2$ are dissolved in 2400 ml water. The alkaline cadmium-salt solution is added dropwise to the phosphor suspension, the pH-value of the suspension being held between 6.9 and 7.5 by adding an ammonium hydroxide solution.

A quantity of 200 g $CoAl_2O_4$ pigment are suspended in 500 ml water and the pigment suspension is introduced into an agitating ball mill together with grinding balls of yttrium-stabilized $ZrO_2$. After grinding for two hours at 750 U/min, 25 ml of the pigment suspension are added to the phosphor suspension. Immediately after that, a solution of 4.0 g of a latex (Neocryl A550® ICI, 40% in water) in 56 ml water are added to the suspension and stirred for one hour. Subsequently, the coating reaction is initiated by adding 50 ml of a 1-molar $NH_4NO_3$ solution. Subsequently, the suspension is filtered, whereafter the phosphor is washed with a 1:1 mixture of water and ethanol, and, finally, dried for 24 hours at 50° C.

EXEMPLARY EMBODIMENT 23

A quantity of 16.8 g polyphosphoric acid (96 wt. %, Merck) are admixed with 200 ml of a 1-molar ammonia solution which is cooled to 5° C. As soon as the pH-value falls below 6, a concentrated ammonia solution is added dropwise, so that the pH-value of the solution is approximately 7 after the polyphosphoric acid has dissolved completely. Subsequently, the solution is brought to 2500 ml by adding water. A quantity of 1000 g red-luminescing ZnCdS:Ag phosphor are suspended in said solution and stirred for 20 minutes. Simultaneously, 0.150 mol $Zn(NO_3)_2$ are dissolved in 2400 ml water. The zinc-salt solution is added dropwise to the phosphor suspension, the pH-value of the suspension being held between 6.9 and 7.5 by adding an ammonium-hydroxide solution.

A quantity of 200 g red $Fe_2O_3$ pigment are suspended in 500 ml water and the pigment suspension is introduced into an agitating ball mill together with grinding balls of yttrium-stabilized $ZrO_2$. After grinding for 2 hours at 750 U/min, 25 ml of the pigment suspension are added to the phosphor suspension. Immediately after that, a solution of 4.0 g of a latex (Neocryl A550®, ICI, 40% in water) in 56 ml water are added to the suspension and stirred for one hour. Subsequently, the coating reaction is initiated by adding 50 ml of a 1-molar $NH_4NO_3$ solution. Subsequently, the suspension is filtered, whereafter the phosphor is washed with a 1:1 mixture of water and ethanol and, finally, dried for 24 hours at 50° C.

EXEMPLARY EMBODIMENT 24
(flat-panel display screen-wet process)

A quantity of 125.3 g polyphosphoric acid (96 wt. %, Merck) are admixed with 1500 ml of a 1-molar ammonia solution which is cooled to 5° C. As soon as the pH-value falls below 6, a concentrated ammonia solution is added dropwise, so that the solution has a pH-value of approximately 7 after the polyphosphoric acid has dissolved completely. Subsequently, this ammonium-polyphosphate solution is brought to 2500 ml by adding water. A quantity of 500 g blue-luminescing ZnS:Ag phosphor are dispersed in 167.5 ml of the above-mentioned ammonium-polyphosphate solution and 240 ml water, and the pH-value of the suspension is set to 7.3. Simultaneously, 17.7 g $Cd(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a polyvinyl-alcohol solution (Mowiol®40-88, Hoechst, 10 wt. % in water) whose pH-value is set to 7 are stirred into the phosphor suspension. Finally, 10 ml of an ammonium-dichromate solution (10 wt. % in water) are added.

A quantity of 500 g green-luminescing ZnS:Cu phosphor are dispersed in 167.5 ml ammonium-polyphosphate solution and 240 ml water, and the pH-value of the suspension is set to 7.3. Simultaneously, 17.7 g $Cd(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a PVAL solution (Mowiol® 40-88, Hoechst 10 wt. % in water) whose pH-value is set to 7 are stirred into the phosphor suspension. Finally, 10 ml of an ammonium-dichromate solution (10 wt. % in water) are added.

A quantity of 500 g red-luminescing ZnCdS:Ag phosphor are dispersed in 167.5 ml of an ammonium-polyphosphate solution and 240 ml water, and the pH-value of the suspension is set to 7.3. Simultaneously, 17.7 g $Cd(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a PVAL solution (Mowiol® 44-88, 10 wt. % in water) whose pH-value is set to 7 are stirred into the phosphor suspension. Finally, 10 ml of an ammonium-dichromate solution (10 wt. % in water) are added.

A thin layer of said ZnS:Ag suspension is applied to a substrate of a flat-panel display screen by means of a doctor blade and dried at 40° C. This layer is subsequently exposed through a shadow mask, causing the exposed areas of said layer to become water-insoluble. Subsequently, the layer is spray-developed with water, so that the layer is removed at the unexposed areas and only the punctiform picture elements remain on the substrate. A thin layer of ZnS:Cu and ZnCdS:Ag is applied, exposed and developed in a similar manner. Next, the organic constituents of the display screen thus obtained are burned out at temperatures >400° C.

A display screen having three phosphor compositions in the colours red, blue and green, which are not provided with a stabilizing coating, is manufactured in the same manner and serves as a standard.

These display screens are subjected to an accelerated life test (ALT) as regards picture brightness and colour reproduction in relation to the radiant energy of 4 kV radiation launched into said display screens. The efficiency I/Io of the display screen used as a standard decreases substantially in the beginning and finally remains constant at a level of 20% of the starting value, however, the picture brightness of the display screen having the phosphors in accordance with the invention decreases only little and remains constant at approximately 80% of the starting value.

EXEMPLARY EMBODIMENT 25

The coated phosphor powders in accordance with exemplary embodiments 15 to 23, are used to manufacture a flat-panel display screen for a colour display tube. To this end, a thin light-sensitive layer which becomes sticky upon exposure is provided on the inside of the display screen and dried. Subsequently, this layer is exposed through a shadow mask and the exposed, sticky circular picture elements are toned with a phosphor composition in accordance with exemplary embodiment 19. In a second and third exposure step, other areas of the light-sensitive layer are toned with the phosphor compositions in accordance with exemplary embodiments 16 and 18. Subsequently, said light-sensitive layer is burned out at temperatures >400° C.

A display screen having three phosphor compositions in the colours red, blue and green, which are not provided with a stabilizing coating, is manufactured in the same manner and serves as a standard. These display screens are subjected to an accelerated life test (ALT) as regards picture brightness and colour reproduction in relation to the radiant energy of 4 kV radiation launched into said display screens. The efficiency I/Io of the display screen which serves as a standard decreases substantially in the beginning and finally remains constant at a level of 20% of the starting value, however, the picture brightness of the display screen comprising the phosphors in accordance with the invention decreases only little and remains constant at approximately 80% of the starting value.

EXEMPLARY EMBODIMENT 26

A quantity of 125.3 g polyphosphoric acid (96 wt. %, Merck) are admixed with 1500 ml of a 1-molar ammonia solution which is cooled to 5° C. As soon as the pH-value fals below 6, a concentrated ammonia solution is added dropwise, so that the solution has a pH-value of approximately 7 after the polyphosphoric acid has dissolved completely. Subsequently, this ammonium-polyphosphate solution is brought to 2500 ml by adding water.

A quantity of 500 g blue-luminescing ZnS:Ag phosphor are dispersed in 167.5 ml of the above-mentioned ammonium-polyphosphate solution and 240 ml water, and the pH-value of the suspension is set to 7.3. Simultaneously, 17.7 g $Ca(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a polyvinyl-alcohol solution (Mowiol®40–88, Hoechst, 10 wt. % in water) whose pH-value is set to 7 is added to the phosphor suspension while stirring. Finally, 10 ml of an ammonium-dichromate solution (10 wt. % in water) are added.

A quantity of 500 g of green-luminescing ZnS:Cu phosphor are dispersed in 167.5 ml ammonium-polyphosphate solution and 240 ml water, and the pH-value of the suspension is set to 7.3. Simultaneously, 17.7 g $Ca(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a PVAL solution (Mowiol® 40–88, Hoechst, 10 wt. % in water) whose pH-value is set to 7 are stirred into the phosphor suspension. Finally, 10 ml of an ammonium-dichromate solution (10 wt. % in water) are added.

A quantity of 500 g of red-luminescing ZnCdS:Ag phosphor are dispersed in 167.5 ml of an ammonium-polyphosphate solution and 240 ml water, and the pH-value of the suspension is set to 7.3. Simultaneously, 17.7 g $Ca(NO_3)_2.4H_2O$ are dissolved in 150 ml water and the solution is added dropwise to the phosphor suspension within one hour. While the solution is being added dropwise, the pH-value of the solution is held between 6.9 and 7.3 by dropwise adding an ammonium-hydroxide solution. Subsequently, 650 g of a PVAL solution (Mowiol® 44–88, 10 wt. % in water) whose pH is set to 7 are stirred into the phosphor suspension. Finally, 10 ml of an ammonium-dichromate solution (10 wt. % in water) are added.

A thin layer of said ZnS:Ag suspension is applied to a substrate of a flat-panel display screen by means of a doctor blade and dried at 40° C. This layer is subsequently exposed through a shadow mask, causing said layer to become water-insoluble in the exposed areas. Subsequently, the layer is spray-developed with water, so that the layer is removed at the unexposed areas and only the punctiform picture elements remain on the substrate. A thin layer of ZnS:Cu and ZnCdS:Ag is applied, exposed and developed in a similar manner. Next, the organic constitutents of the display screen thus obtained are burned out at temperatures >400° C.

A display screen having three phosphor compositions in the colours red, blue and green, which are not provided with a stabilizing coating, is manufactured in the same manner and serves as a standard. These display screens are subjected to an accelerated life test (ALT) as regards picture brightness and colour reproduction in relation to the radiant energy of 4 kV radiation launched into said display screens. The efficiency I/Io of the display screen used as a standard decreases substantially in the beginning and finally remains constant at a level of 20% of the starting value, however, the picture brightness of the display screen having the phosphors in accordance with the invention decreases only little and remains constant at approximately 80% of the starting value.

EXEMPLARY EMBODIMENT 27

The coated phosphor powders in accordance with exemplary embodiments 1 to 14, are used to manufacture a flat-panel display screen for a colour display tube. To this end, a thin light-sensitive layer which becomes sticky upon exposure is provided on the inside of the display screen and dried. Subsequently, this layer is exposed through a shadow mask and the exposed, sticky picture elements are toned with a phosphor composition in accordance with exemplary embodiment 1. In a second and third exposure step, other areas of the light-sensitive layer are toned with the phosphor powders in accordance with exemplary embodiments 2 and 3. Subsequently, said light-sensitive layer is burned-out at a temperature of 400° C. A display screen having three phosphor compositions in the colours red, blue and green, which are not provided with a stabilizing coating, is manufactured in the same manner and serves as a standard.

These display screens are subjected to an accelerated life test (ALT) as regards picture brightness and colour reproduction in relation to the radiant energy of 4 kV radiation launched into said display screens. The efficiency I/Io of the display screen which serves as a standard decreases substantially in the beginning and finally remains constant at a level of 20% of the starting value, however, the picture brightness of the display screen comprising the phosphors in accordance with the invention decreases only little and remains constant at approximately 80% of the starting value.

We claim:

1. A display screen comprising a phosphor composition one or more of a sulphide and selenide-containing phosphor which is provided with a coating which comprises one or more compounds of catena-polyphosphates and one or more alkaline earth metals, zinc, cadmium and manganese.

2. A display screen as claimed in claim 1, characterized in that the catena-polyphosphates have a chain length of 3 to 90.

3. A display screen as claimed in claim 1, characterized in that the coating comprises catena-polyphosphates of one or more alkaline earth metals and 0.1 to 20 wt. % catena-polyphosphates of zinc, cadmium and/or manganese.

4. A display screen as claimed in claim 1, characterized in that the alkaline earth metal is calcium, strontium or barium and the coating comprises 10 wt. % cadmium-catena-polyphosphate.

5. A display screen as claimed in claim 1, characterized in that the alkaline earth metal is at least an element of the group formed by calcium, strontium and/or barium, and the coating comprises 5 wt. % zinc-catena-polyphosphate and/or 5 wt. % manganese-catena-polyphosphate.

6. A display screen as claimed in claim 1, characterized in that the phosphor is composed of activated zinc sulphide, zinc cadmium sulphide, zinc sulphide selenide and/or zinc cadmium sulphide selenide, and the coating comprises one or more calcium-catena-polyphosphates.

7. A display screen as claimed in claim 1, characterized in that the phosphor is composed of activated zinc sulphide, zinc selenide and/or zinc sulphide selenide, and the coating comprises cadmium-catena-polyphosphate.

8. A display screen as claimed in claim 1, characterized in that the phosphor is composed of activated zinc sulphide, zinc selenide and/or zinc sulphide selenide, and the coating comprises zinc-catena-polyphosphate.

9. A display screen as claimed in claim 1, characterized in that the phosphor is composed of activated cadmium sulphide and/or cadmium sulphide selenide, and the coating comprises cadmium-catena-polyphosphate.

* * * * *